(12) United States Patent
Tsunekawa

(10) Patent No.: US 9,829,062 B2
(45) Date of Patent: Nov. 28, 2017

(54) BUMP STOPPER CAP

(71) Applicant: TOYOTA JIDOSHA KABUSHIKI KAISHA, Toyota-shi, Aichi (JP)

(72) Inventor: Hajime Tsunekawa, Aisai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 52 days.

(21) Appl. No.: 14/842,549

(22) Filed: Sep. 1, 2015

(65) Prior Publication Data
US 2016/0084336 A1    Mar. 24, 2016

(30) Foreign Application Priority Data

Sep. 22, 2014    (JP) .................................. 2014-192416

(51) Int. Cl.
*F16F 9/38* (2006.01)
*F16F 9/58* (2006.01)

(52) U.S. Cl.
CPC .............. *F16F 9/585* (2013.01); *F16F 9/58* (2013.01); *F16F 9/38* (2013.01)

(58) Field of Classification Search
CPC .... F16F 9/3242; F16F 9/38; F16F 9/58; F16F 13/005; F16F 13/007; B60G 11/56; B60G 2204/46; B60G 2204/4604; B60G 2202/31
See application file for complete search history.

(56) References Cited

U.S. PATENT DOCUMENTS

| | | | | | |
|---|---|---|---|---|---|
| 4,364,457 | A | * | 12/1982 | Wossner | ................. F16F 9/364 188/322.17 |
| 8,418,821 | B2 | * | 4/2013 | Henneberg | ............. B60G 13/00 188/322.12 |
| 2002/0189441 | A1 | * | 12/2002 | Collis | ....................... F16F 9/58 92/165 R |
| 2004/0168871 | A1 | * | 9/2004 | Handke | ................ B60G 15/062 188/322.12 |

(Continued)

FOREIGN PATENT DOCUMENTS

| | | | | |
|---|---|---|---|---|
| CN | 202468822 U | | 10/2012 | |
| DE | 2826563 A1 | * | 12/1978 | ............ F16F 9/3242 |
| DE | 9109020 U1 | * | 10/1991 | ........... B60G 13/001 |

(Continued)

OTHER PUBLICATIONS

Aug. 16, 2017 Office Action issued in Chinese Patent Application No. 201510567302.1.

*Primary Examiner* — Anna Momper
(74) *Attorney, Agent, or Firm* — Oliff PLC

(57) ABSTRACT

The endurance of a bump stopper cap is improved by preventing a clearance from being generated between a back face of a top board portion of the bump stopper cap and a nib surface of a cylinder main body. A non-interference region in which a rib is not formed is disposed on the top side of a circular-cylinder portion of the bump stopper cap, and an interference region where the rib is formed is disposed on the opening side from this non-interference region. Since the non-interference region can be deformed freely in association with the deformation of the interference region when the bump stopper cap is pressed fit at the nib of the cylinder main body, a seating surface which is the back face of the top board portion can be properly seated on the nib surface of the cylinder main body.

2 Claims, 10 Drawing Sheets

(56) References Cited

U.S. PATENT DOCUMENTS

2013/0043625 A1* 2/2013 Mrugalla .................. F16F 9/38
                                                  267/140.13
2014/0333033 A1* 11/2014 Kiecksee ................. F16J 15/56
                                                  277/550

FOREIGN PATENT DOCUMENTS

| DE | 102013203026 A1 * | 1/2014 | ................ F16F 9/38 |
| DE | 102014224636 A1 * | 6/2016 | ............ F16F 9/3242 |
| JP | 2005265091 A | 9/2005 | |
| JP | 2006-144952 A | 6/2006 | |
| JP | 2007-010065 A | 1/2007 | |
| JP | 2013-146092 A | 7/2013 | |
| JP | 2013-164092 A | 8/2013 | |
| WO | WO 2010145900 A1 * | 12/2010 | ................ F16F 9/38 |
| WO | WO 2016008666 A1 * | 1/2016 | ................ F16F 9/38 |

* cited by examiner

BUMP STOPPER CAP

BACKGROUND OF THE INVENTION

1. Field of the Invention

The present invention relates to a bump stopper cap which is attached to a shock absorber and collides with a bump stopper when the shock absorber contracts.

2. Description of the Related Art

For instance, a shock absorber comprises a bump stopper which regulates a contraction stroke thereof. For example, the bump stopper is attached to a piston rod in face of a bump stopper cap fixed to the upper end of a cylinder main body (absorber shell) of the shock absorber, as shown in Patent Document 1. The bump stopper collides with the bump stopper cap to regulate the contraction stroke of the shock absorber and absorbs an impact at the time of the collision, when a wheel is thrust up and the shock absorber contracts greatly.

As shown in FIG. 11, for instance, the bump stopper cap 200 is integrally formed in a configuration wherein one end of the circular-cylinder portion 210 formed in a shape of a cylinder is plugged up with a top board portion 220 in a shape of a ring. Recently, many bump stopper caps 200 are integrally formed with a resin material. The bump stopper cap 200 is pressed into and fixed to the tip of the cylinder main body 110 in a status that the piston rod 120 of the shock absorber 100 was inserted into the through-hole 230 drilled in the top board portion 220. The front face 220b of the top board portion 220 serves as a collision surface which collides with the bump stopper 400 (refer to FIG. 12), and the back face 220a of the top board portion 220 serves as a seating surface which is seated on the nib surface 110b of the cylinder main body 100.

The interference portion 300 which squeezes the outer circumference surface 110a of the cylinder main body 110 inward in a radial direction is formed in the inner circumference surface 210a of the circular-cylinder portion 210. The interference portion 300 is formed by integrally forming a rib prolonged along an axial direction on the inner wall of the circular-cylinder portion 210 at a predetermined interval in a circumferential direction, for example. This interference portion 300 is formed to extend to a portion connected with the top board portion 220 in the circular-cylinder portion 210 (referred to as the connecting portion 240), i.e., to the nib of the circular-cylinder portion 210 along the axial direction. In addition, as the interference portion 300, in place of the rib, interference may be formed on the whole circular-cylinder object.

CITATION LIST

Patent Literature

[Patent Document 1] Japanese Patent Application Laid-Open (kokai) No. 2005-265091

SUMMARY OF THE INVENTION

However, the circular-cylinder portion 210 may be deformed into a shape of skirt spreading when the bump stopper cap 200 is press fitted into the cylinder main body 100. This is because the portion nearer to the connecting portion 240 in the interference portion 300 has higher rigidity and therefore a proper deformation of the interference portion 300 outward in a radial direction cannot be acquired at the time of press fit since the interference portion 300 is formed to extend to the connecting portion 240 connected with the top board portion 220. For this reason, in the middle of press fit, in the circular-cylinder portion 210, the bump stopper cap 200 may be deformed into a shape of skirt spreading designating the connecting portion 240 as the starting point of the deformation and the clearance D may be produced between the back face 220a (seating surface) of the top board portion 220 and the nib surface 110b of the cylinder main body 100. In addition, in FIG. 11 and FIG. 12, the deformation of the bump stopper cap 200 is shown extremely greatly, in order to make it easy to be understood.

In a status that such a clearance D has been produced, as shown in FIG. 12, whenever a wheel is thrust up and the bump stopper 400 collides with the top board portion 220 of the bump stopper cap 200 while a vehicle is moving, a load in a direction in which fills the above-mentioned clearance D is inputted from the bump stopper 400 to the bump stopper cap 200. Thereby, in the bump stopper cap 200, stresses concentrate in the vicinity of the connecting portion 240 in the circular-cylinder portion 210, and a large force which further deforms the circular-cylinder portion 210 acts. Therefore, the endurance of the bump stopper cap 200 will fall.

The present invention has been made in order to cope with the above-mentioned problem, and one of its objectives is to improve the endurance of a bump stopper cap.

In order to attain the above-mentioned objective, the feature of the present invention is in a bump stopper cap (20) attached by press fit to a tip of a cylinder main body (11) of a shock absorber (10) in which a piston rod (12) moves forward and backward with respect to said cylinder main body in accordance with expansion and contraction of a suspension spring (50), comprising:

a circular-cylinder portion (21) which covers an outer circumference surface of the tip of said cylinder main body, and a top board portion (22) which is continuously formed from a nib of said circular-cylinder portion, has a seating surface (22a) which is seated on a cylinder main body nib surface and a collision surface (22b) which collides with a bump stopper, and receives a load from said bump stopper, and said cylinder main body nib surface is a nib of said cylinder main body and serves as a surroundings of said piston rod, and an interference portion (30) which squeezes said outer circumference surface of said cylinder main body inward in a radial direction is formed in an inner circumference surface of said circular-cylinder portion, wherein;

said interference portion is formed in a region (X) a predetermined distance away from said seating surface in an axial direction of said circular-cylinder portion so that the interference portion does not reach said seating surface.

The bump stopper cap according to the present invention integrally comprises the circular-cylinder portion which covers the outer circumference surface of the tip of the cylinder main body and the top board portion continuously formed from the nib of the circular-cylinder portion. The top board portion has the seating surface which is seated on the cylinder main body nib surface, which is the nib of the cylinder main body and serves as the surroundings of the piston rod, and the collision surface which collides with the bump stopper, and serves as a portion which receives a load from the bump stopper.

The interference portion which squeezes the outer circumference surface of the cylinder main body inward in the radial direction is formed in the inner circumference surface of the circular-cylinder portion. Therefore, by pressing the circular-cylinder portion into the tip of a cylinder main body, this interference portion is elastically deformed outward in the radial direction to squeeze the outer circumference surface of the cylinder main body inward in the radial direction and thereby the bump stopper cap is fixed to a cylinder main body.

When the interference portion reaches the seating surface of the top board portion, in a region nearer to seating surface, it becomes more difficult to acquire a deformation outward in the radial direction of the interference portion by press fit, and it may be unable to fix the bump stopper cap to a desired location with respect to the cylinder main body. Then, in the present invention, the interference portion is formed in the region a predetermined distance away from the seating surface in the axial direction of the circular-cylinder portion so that it does not reach the seating surface. Therefore, the nib of the circular-cylinder portion can be freely deformed in the radial direction since the interference portion is not formed. Thereby, the seating surface of the top board portion can be properly seated on the nib surface of the cylinder main body. As a result, the endurance of the bump stopper cap can be improved.

For instance, it is preferable that the interference portion is a rib (elongated protrusion) which has a longitudinal direction in the axial direction of the circular-cylinder portion on the inner circumference surface of the circular-cylinder portion. Moreover, it is preferable that a plurality of the ribs is formed apart mutually in the circumference direction of the circular-cylinder portion. Moreover, it is preferable that a though-window (aperture) is formed in a portion between each rib and the seating surface in the circular-cylinder portion, for example.

In addition, in the above-mentioned illustration, in order to help understanding of the invention, the reference signs used in the embodiment are attached in parenthesis to the configuration of invention corresponding to an embodiment. However, each constituent elements of the invention are not limited to the embodiment specified with the above-mentioned reference signs.

DESCRIPTION OF THE INVENTION

Figure 1:
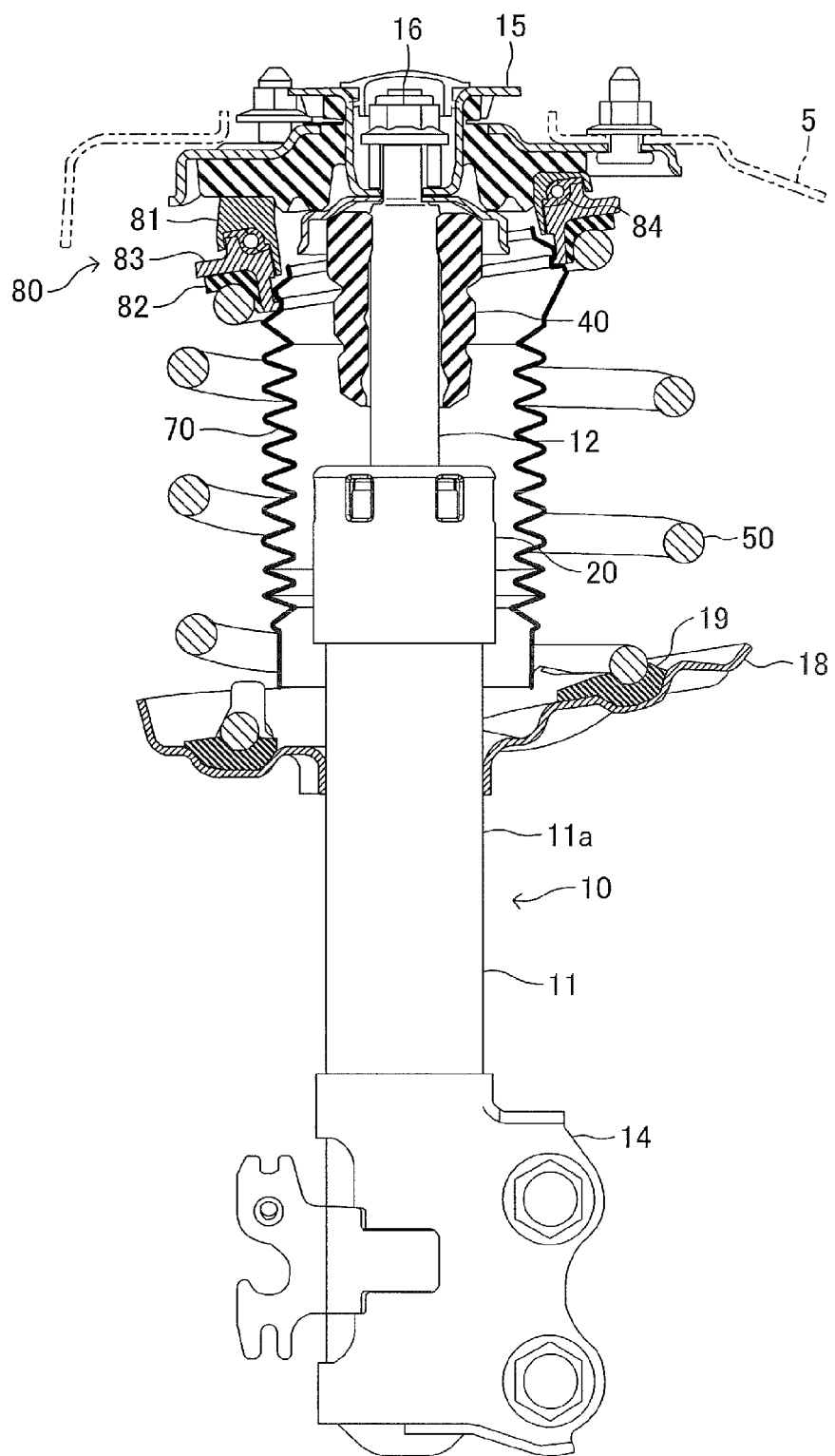
FIG. 1 is a schematic configuration diagram of a suspension device for a vehicle which comprises a bump stopper cap according to the present embodiment.

Hereafter, a bump stopper cap according to one embodiment of the present invention will be explained using drawings. FIG. 1 is a schematic configuration diagram of a suspension device for a vehicle which comprises a bump stopper cap according to the present embodiment. This suspension device for a vehicle (hereafter, it will be simply referred to as a suspension device) is a strut-type suspension device which hangs a wheel from a vehicle body. The suspension device comprises the shock absorber 10 and the coil spring 50 which is a suspension spring.

The shock absorber 10 comprises the cylinder main body 11 and the piston rod 12 having a piston (not shown) which moves forward and backward inside the cylinder main body 11 at the nib. The cylindrical bump stopper cap 20 is pressed downward into and fixed to the top end portion of the cylinder main body 11. The bottom end portion of the cylinder main body 11 is fastened to the wheel side member (knuckle), which is not shown, through the bracket 14.

The upper end of the piston rod 12 is fastened to the upper support 15 with the nut 16. The upper support 15 is fastened to the vehicle body 5, and the cylindrical top spring seat unit 80 is disposed on the back side. The top spring seat unit 80 comprises the base portion 81 which is non-rotatably inset in the upper support 15, the top sheet portion 83 in a shape of a ring, which supports the coil spring 50 through the insulator 82, and the strut bearing 84 which is disposed between the base portion 81 and the top sheet portion 83 and rotatably supports the top sheet portion 83 with respect to the base portion 81. In addition, in this specification, directions such as top and bottom show those in a status that the suspension device is properly disposed in the vehicle body 5.

The bottom spring seat 18 in a shape of a ring, which supports the coil spring 50 through the insulator 19, is fixed to the outer circumference surface 11a of the cylinder main body 11 by welding. The coil spring 50 is attached in a status that it is compressed between the top sheet portion 83 of the top spring seat unit 80 and the bottom spring seat 18.

Between the shock absorber 10 and the coil spring 50, the dust cover 70 for protecting an oil seal of the shock absorber 10 from foreign matters, such as sand, is formed. The upper end of the dust cover 70 is fitted in and supported by the top sheet portion 83. Although it is not shown here that the lower end of the dust cover 70 is supported, it may be supported by a supporting piece fixed to the outer circumference surface 11a of the cylinder main body 11, or a configuration wherein it is supported by the locking piece 29 formed in the bump stopper cap 20, as shown in a modification (FIG. 10) which will be mentioned later, etc. can be employed, for example.

The bump stopper 40 is disposed in the upper part of the piston rod 12. The bump stopper 40 is supported by the upper support 15 or piston rod 12 grade, etc., for example. The bump stopper 40 is formed of an elastic material, such as a rubber and a urethane. The bump stopper 40 is disposed in face of the bump stopper cap 20 fixed to the tip of the cylinder main body 11, and it collides with the bump stopper cap 20 to regulate the contraction stroke of the shock absorber 10 and absorbs the impact at the time of the collision, when a wheel is thrust up and the shock absorber 10 contracts greatly.

At the time of the collision with the bump stopper 40, the bump stopper cap 20 supports the load of the bump stopper 40, and restricts a stroke movement of the shock absorber 10.

Figure 2:
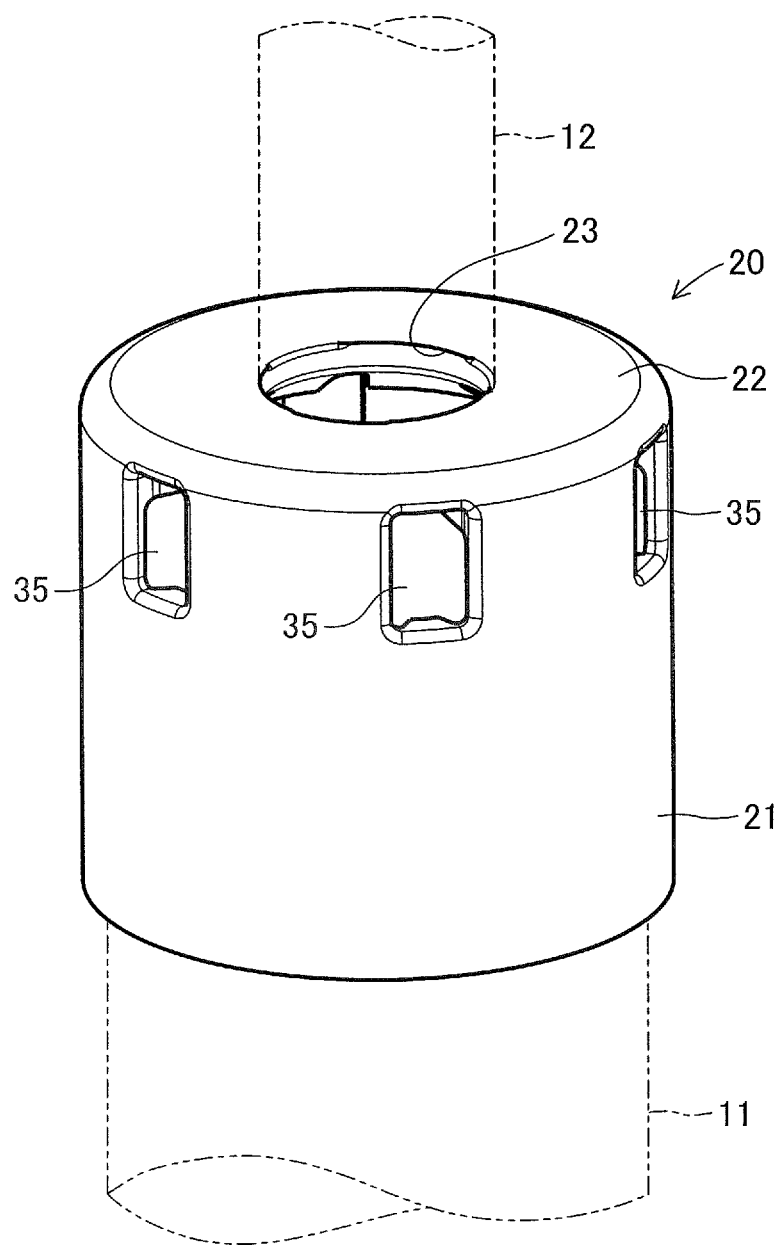
FIG. 2 is a perspective diagram of the bump stopper cap.
Figure 3:
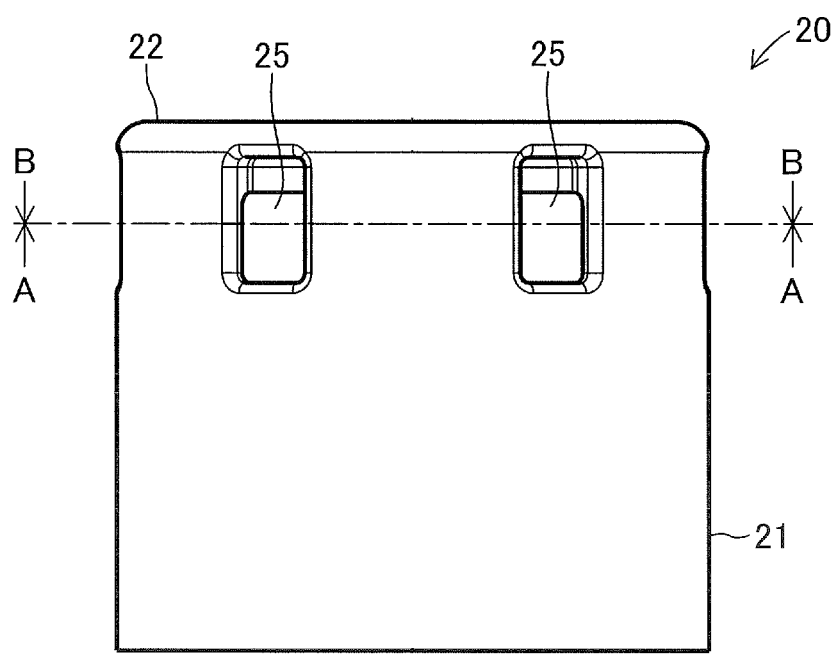
FIG. 3 is a front elevation view of the bump stopper cap.
Figure 4:
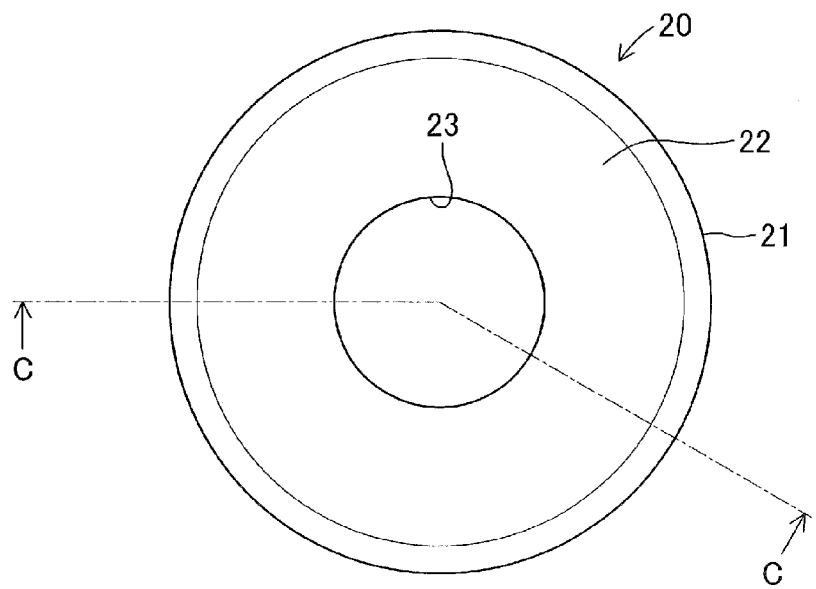
FIG. 4 is a top view of the bump stopper cap.

The bump stopper cap 20 is obtained by integrally forming the circular-cylinder portion 21 formed cylindrical and the top board portion 22 formed continuously from one end of the circular-cylinder portion 21 so as to cover the one end of the circular-cylinder portion 21 with a resin material (with which glass fiber may be mixed), as shown in FIG. 2. The through-hole 23 through which the piston rod 12 is inserted so as to be able to move forward and backward is drilled in the center of the top board portion 22. Therefore, the top board portion 22 is formed in a shape of a ring-like tabular. Hereafter, in the circular-cylinder portion 21, the side on which the top board portion 22 is formed is referred to as the top side, and the side which is opened, i.e., the side opposite to the top side, is referred to as the open side.

Figure 6:
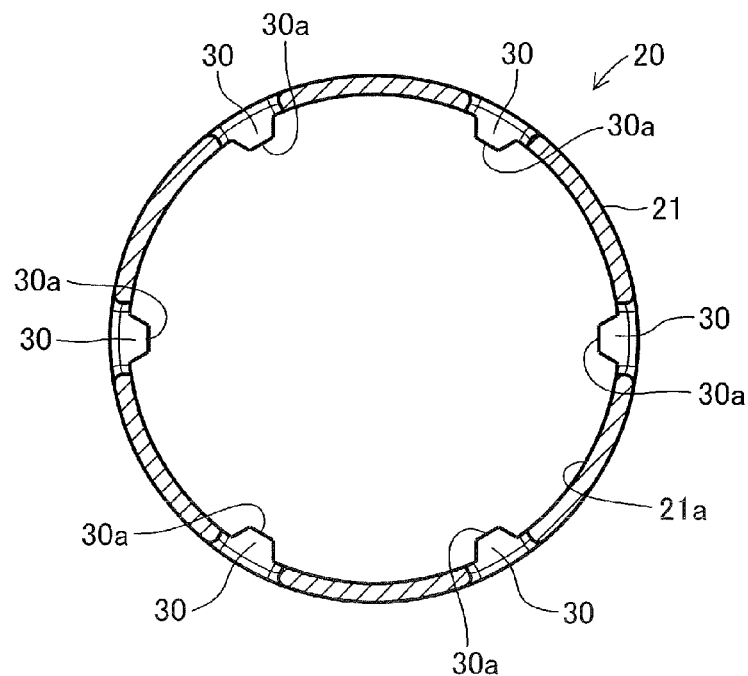
FIG. 6 is a transverse cross-sectional view (sectional view in the B-B directional view in FIG. 3) of the bump stopper cap.
Figure 7:
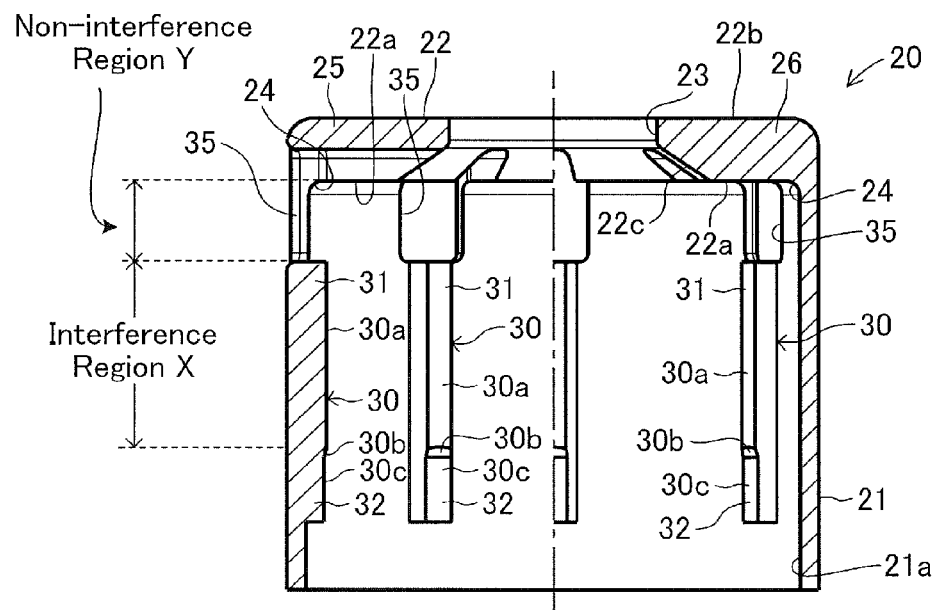
FIG. 7 is a longitudinal cross-sectional view (sectional view in the C-C directional view in FIG. 4) of the bump stopper cap.

The front side of the top board portion 22 becomes the side which collides with the bump stopper 40, and the back side thereof becomes the side which is seated on the nib surface 11b (refer to FIG. 8) of the cylinder main body 11. The circular-cylinder portion 21 is a portion pressed fit in the tip of the cylinder main body 11, and a plurality of ribs 30 which fastens the outer circumference surface 11a of the cylinder main body 11 inward in a radial direction is integrally formed in the inner circumference surface 21a thereof, as shown in FIG. 6 and FIG. 7. This rib 30 is an elongated protrusion projecting from the inner circumference surface 21a of the circular-cylinder portion 21 inward in the radial direction, and it is formed so as to extend long along the circular-cylinder axial direction of the circular-cylinder portion 21. The ribs 30 are arranged at an equal interval in the circumference direction in the inner circumference surface 21a of the circular-cylinder portion 21. The inner circumference surface 30a of the rib 30 (surface facing the center side of the circular-cylinder portion 21) is a surface which fastens the outer circumference surface 11a of the cylinder main body 11, and is formed arc-like in a planar view.

The rib 30 has the slope 30b formed in the middle of the longitudinal direction of the rib 30, and its height (dimension of the protrusion in the radial direction) on the open side of the circular-cylinder portion 21 from the slope 30b is slightly low. This low-height portion does not have a role for fastening the outer circumference surface 11a of the cylinder main body 11 inward in the radial direction, but a role as a guide which guides the cylinder main body 11 into the bump stopper cap 20. Hereafter, the portion on the top side from the slope 30b of the rib 30 (portion with a high height) is referred to as the main rib 31, and the portion on the open side from the slope 30b of the rib 30 (low-height portion including the slope) is referred to as the guide rib 32.

The main rib 31 is formed so that the diameter of the virtual cylindrical surface which is obtained by connecting the inner circumference surfaces 30a is smaller than the outer diameter of the cylinder main body 11. Therefore, the inner diameter of the main ribs 31 spreads when the bump stopper cap 20 is pressed fit in the nib of the cylinder main body 11, and the main ribs 31 fastens the outer circumference surface 11a of the cylinder main body 11 inward in the radial direction by the force to restore the elastic deformation due to press fit. This main rib 31 corresponds to the interference portion of the present invention. The region (region also including the main ribs 31) in which the main ribs 31 in the circular-cylinder portion 21 are formed is referred to as the interference region X. The interference region X is formed in the cylindrical region with a width of the dimension in the longitudinal direction of the main ribs 31, as shown in FIG. 7.

The guide rib 32 is formed so that the diameter of the virtual cylindrical surface which is obtained by connecting the inner circumference surfaces 30c has the almost same dimension as the outer diameter of the cylinder main body 11. Therefore, at the time of press fit, it does not fasten the outer circumference surface 11a of the cylinder main body 11 inward in the radial direction. In addition, as for the rib 30, it is not necessary to form the guide rib 32, or a small interference may be formed in the guide rib 32.

As shown in FIG. 7, in the inner circumference surface 21a of the circular-cylinder portion 21, each rib 30 is formed in the middle position of an axial direction, and is not extended to the portion connected with the top board portion 22 in the circular-cylinder portion 21 (referred to as the connecting portion 24). Therefore, the circular-cylinder portion 21 is not provided with the interference which fastens the outer circumference surface 11a at the nib of the cylinder main body 11 to the top side. The region where the rib 30 (the main ribs 31) is not formed on the top side of the circular-cylinder portion 21 is referred to as a non-interference region Y. The non-interference region Y becomes a cylindrical region with a width of a predetermined dimension, which continues from the upper end of the interference region X to the back face of the top board portion 22 (seating surface 22a).

In the circular-cylinder portion 21, the aperture 35 is formed at the top side termination location of each rib 30. This aperture 35 is an aperture for inserting a mold which is needed in order to prepare the non-interference region Y on manufacture (i.e., in order not to form the rib 30 form). Therefore, the top side termination location is determined by this aperture 35, and each rib 30 is not connected with the top board portion 22.

Figure 5:
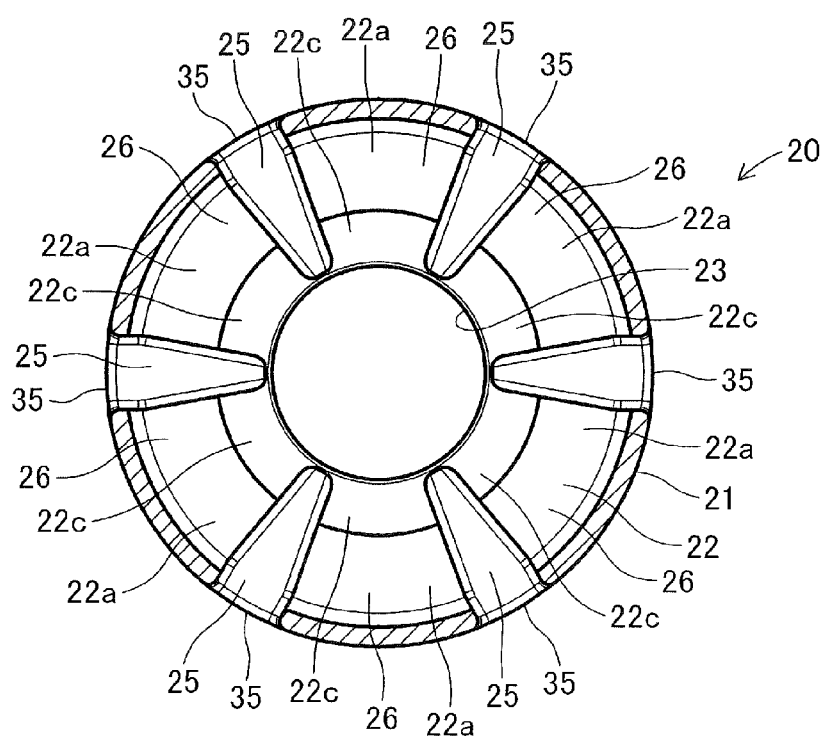
FIG. 5 is a transverse cross-sectional view (sectional view in the A-A directional view in FIG. 3) of the bump stopper cap.

As shown in FIG. 5 and FIG. 7, on the back side in the top board portion 22, the thin-walled portion 25 which is connected with the aperture 35 and the thick-walled portion 26 which is not connected with the aperture 35 are alternately formed in the circumference direction around the through-hole 23 at the center. The thin-walled part 25 has a thinner wall as compared with the thick-walled portion 26. The slope 22c for avoiding an interference with the oil seal 13 of the shock absorber 10 on the center side (side near the through-hole 23) is formed in the thick meat portion 26. The slope 22c is formed so that the wall thickness of the thick-walled portion 26 becomes thinner toward the center side. Therefore, in the thick-walled portion 26, the back face 22a of the region except the slope 22c is the seating surface which is seated on the nib surface 11b of the cylinder main body 11. Hereafter, this back face 22a may be referred to as the seating surface 22a.

The front face 22b of the top board portion 22 is a collision surface which collides with the bump stopper 40, and is formed evenly. Hereafter, this front face 22b may be referred to as the collision surface 22b. In addition, the collision surface 22b does not necessarily need to be formed evenly, and an irregularity may be formed. For instance, in order to reduce an abnormal noise generated by the collision with the bump stopper 40, an irregularity may be formed in the collision surface 22b.

Figure 8:
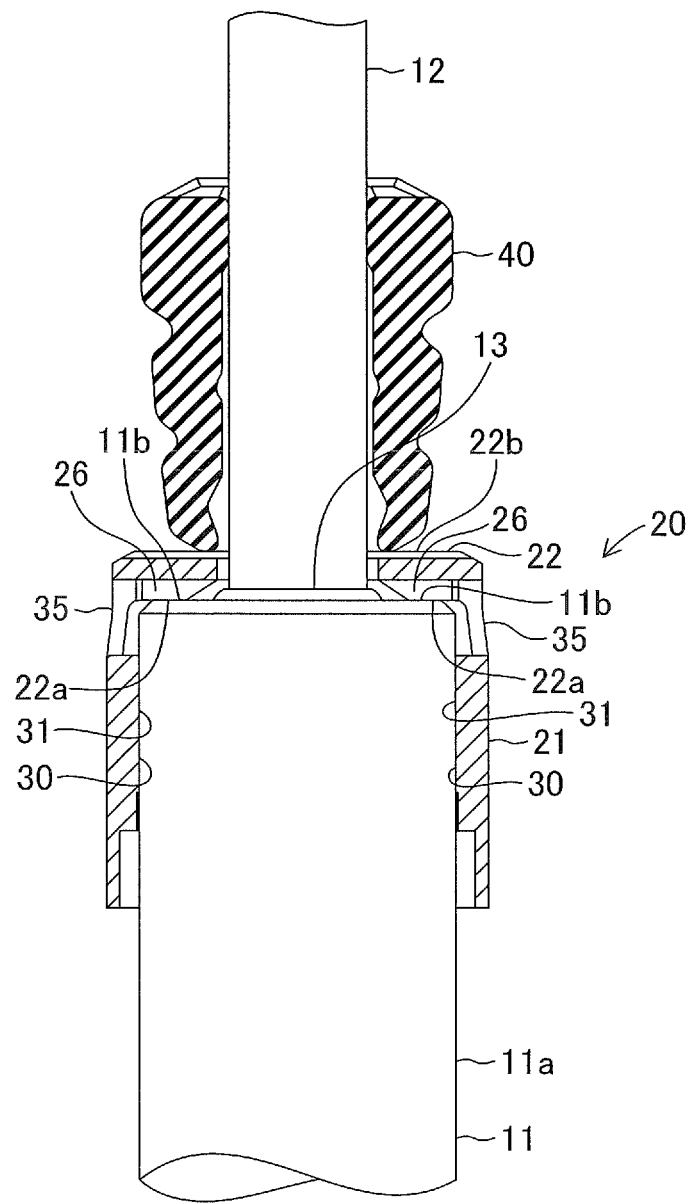
FIG. 8 is a cross-sectional view for showing a status the bump stopper cap is pressed into and fitted in a cylinder main body.

As shown in FIG. 8, the bump stopper cap 20 thus constituted is pressed fit and attached to the tip of the cylinder main body 11 of the shock absorber 10. Therefore, the interference region X of the circular-cylinder portion 21 in which the main ribs 31 are formed is elastically deformed outward in the radial direction, and fastens the outer circumference surface 11a of the cylinder main body 11 inward in the radial direction. Thereby, the bump stopper cap 20 is fixed to the cylinder main body 11.

When the interference region X reaches the seating surface 22a of the top board portion 22, it becomes harder to acquire the deformation outward in the radial direction toward the seating surface 22a, and the bump stopper cap 20 may be unable to be fixed to a desired location with respect to the cylinder main body 11 at the time of press fit. On the other hand, in accordance with the bump stopper cap 20 of the present embodiment, since the interference region X which fastens the cylinder main body 11 inward in the radial direction is not formed on the top side of the circular-cylinder portion 21, i.e., the non-interference region Y is formed, the non-interference region Y can be deformed freely in conformity with the deformation of the interference region X at the time of press fit. Thereby, the outer circumference surface 11a of the cylinder main body 11 can be properly fastened by the deformation of the interference region X of the circular-cylinder portion 21, and the seating surface 22a of the top board portion 22 can be properly seated on the nib surface 11b of the cylinder main body 11.

In accordance with the bump stopper cap 20 of the present embodiment explained above, since a clearance between the seating surface 22a of the top board portion 22 and the nib surface 11b of the cylinder main body 11 can be prevented from being formed, stress concentration when a load from the bump stopper 40 is received is reduced. As a result, the endurance of the bump stopper cap 20 can be improved.

The Second Embodiment

Figure 9:
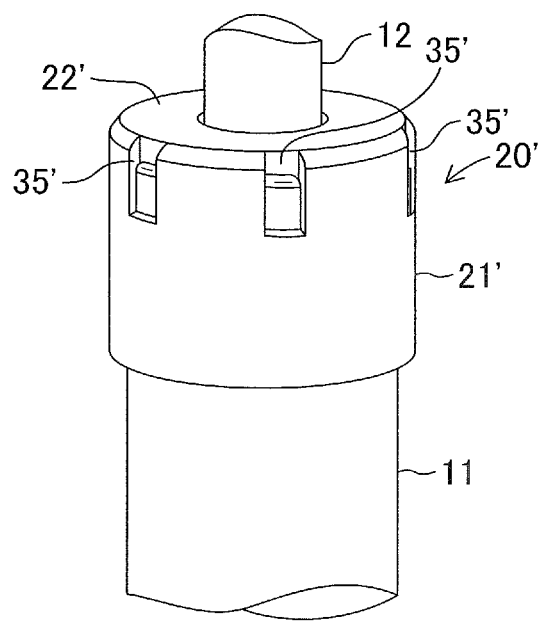
FIG. 9 is a perspective diagram of a bump stopper cap according to a second embodiment.

In the above-mentioned first embodiment, the aperture 35 is formed only in the circular-cylinder portion 21 of the bump stopper cap 20. In this case, it is necessary to move a mold for forming the aperture 35 forward and backward in a direction which intersects perpendicularly with the axial direction of the circular-cylinder portion 21 (transverse direction), and an exclusive mold for forming the aperture is needed separately. On the other hand, in this second embodiment, as shown in FIG. 9, as for the bump stopper cap 20', the aperture 35' is extended not only to the circular-cylinder portion 21', but also to the top board portion 22', in the axial direction. That is, the aperture 35' is formed in a shape formed by cutting out the outer circumference side of the top board portion 22' and the top side of the circular-cylinder portion 21' continuously and straight along the axial direction. Thereby, it is not necessary to prepare an exclusive mold for forming the aperture 35', and the aperture 35' can be formed only by changing the configuration of the upper mold of the bump stopper cap 20'. In addition, as compared with the bump stopper cap 20 according to the first embodiment, except that the shape of the aperture 35' is different, the configuration of the bump stopper cap 20' according to the second embodiment is the same as that of the first embodiment.

As mentioned above, although the bump stopper caps 20 and 20' according to the embodiments of the present invention had been explained, the present invention is not limited to the above-mentioned embodiments, and various modifications are possible unless it deviates from the objective of the present invention.

For instance, although the front faces of the top board portion 22 and 22' are evenly formed in the embodiments, like the bump stopper cap shown in Patent Document 1, for instance, the top board portion itself may be formed irregular, and the collision surface which collides with a bump stopper and the seating surface which is seated on the nib surface of a cylinder main body may be formed so that they are arranged in different plane location (they do not have to be arranged in the spatial relationship of the back and front).

Figure 10:
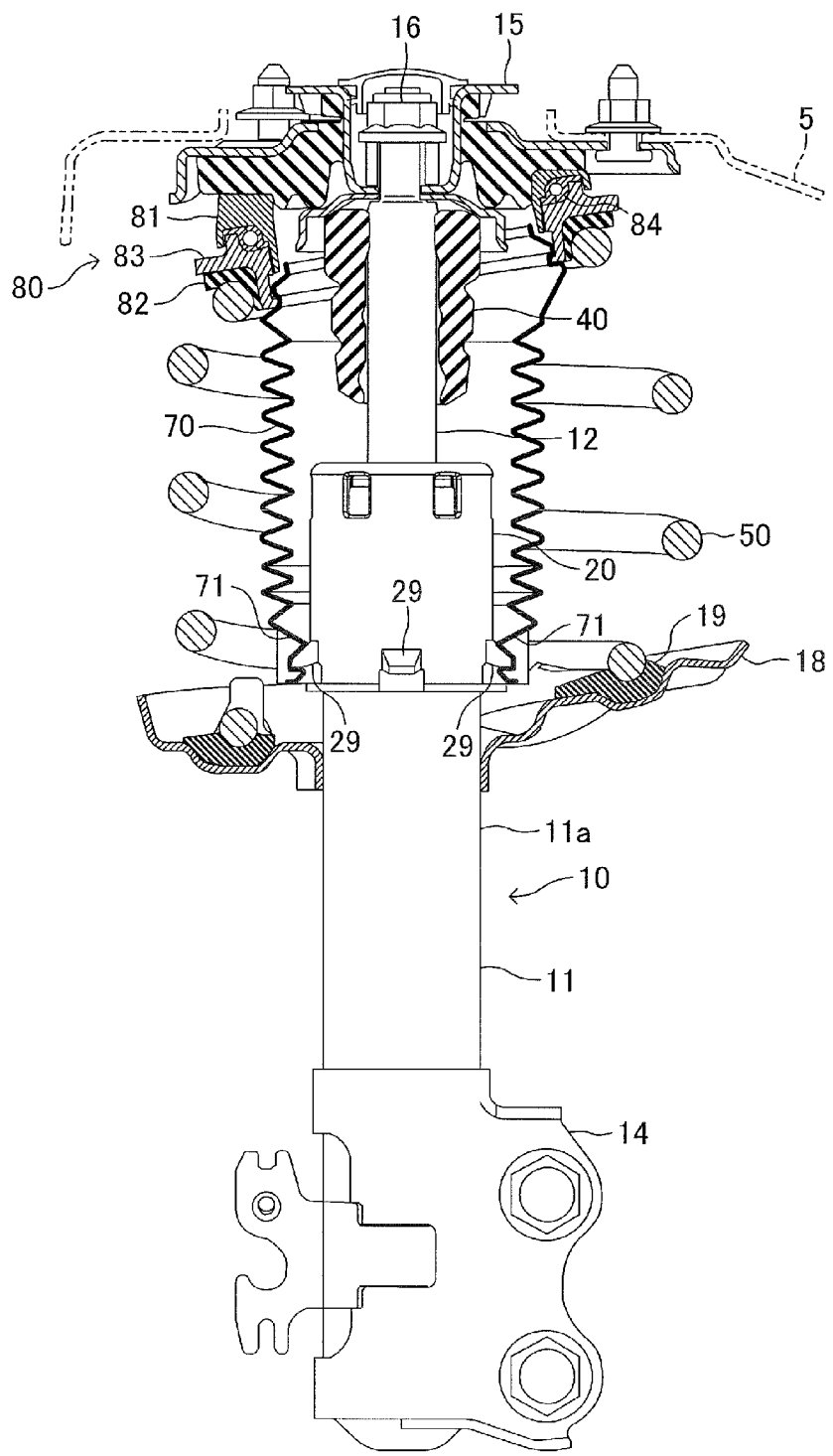
FIG. 10 is a schematic configuration diagram of a suspension device for a vehicle which comprises a bump stopper cap according to a modification.
Figure 11:
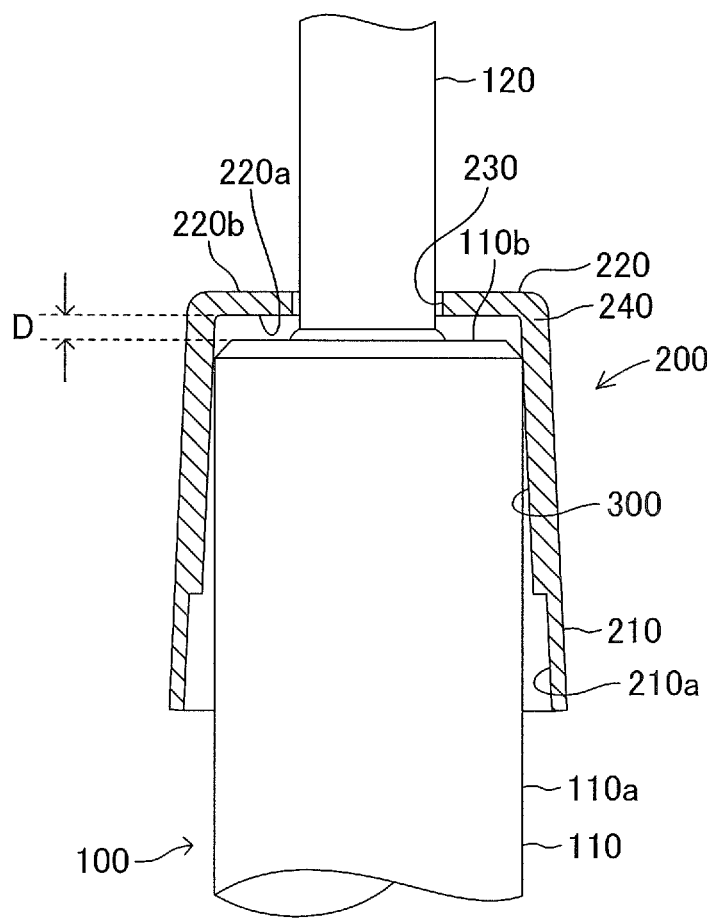
FIG. 11 is a cross-sectional view for showing a status a bump stopper cap according to a conventional example is pressed into and fitted in a cylinder main body.
Figure 12:
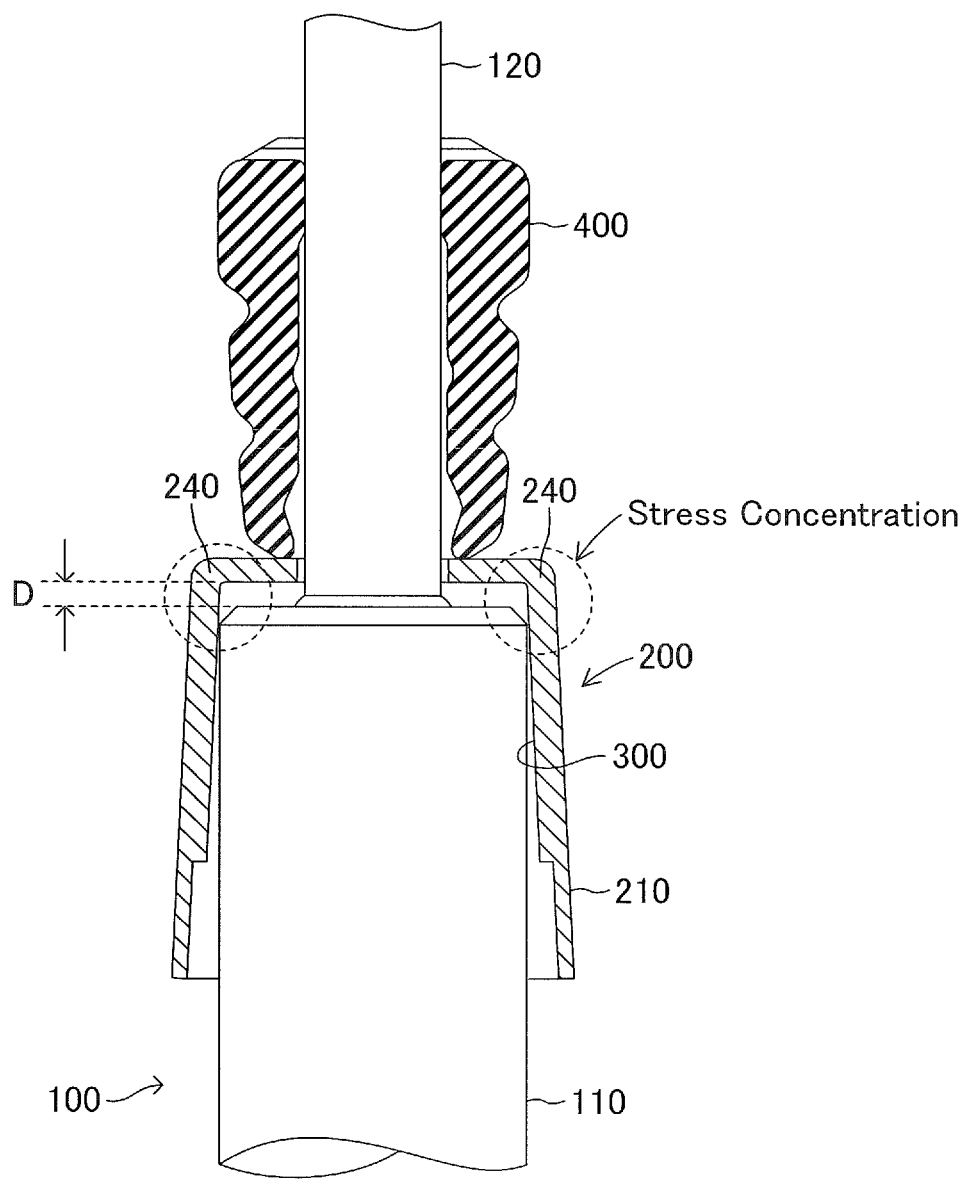
FIG. 12 is a cross-sectional view for showing a status a bump stopper cap according to a conventional example is pressed into and fitted in a cylinder main body.

Moreover, for example, as shown in FIG. 10, a configuration wherein the locking piece 29 which locks and supports the lower end of the dust cover 70 is integrally formed on the open side of the bump stopper cap 20 (or 20') can be also employed.

What is claimed is:

1. A bump stopper cap attached by press fit to a tip of a cylinder main body of a shock absorber in which a piston rod moves forward and backward with respect to said cylinder main body in accordance with expansion and contraction of a suspension spring, comprising:
   a circular-cylinder portion which covers an outer circumference surface of the tip of said cylinder main body,
   a top board portion which is continuously formed from a nib of said circular-cylinder portion, has a seating surface which is seated on a cylinder main body nib surface and a collision surface which collides with a bump stopper, and receives a load from said bump stopper, and said cylinder main body nib surface is a nib of said cylinder main body and extends around said piston rod, and
   an interference portion, which squeezes said outer circumference surface of said cylinder main body inward in a radial direction, formed in an inner circumference surface of said circular-cylinder portion,
   wherein:
   said interference portion is formed in a region of the circular-cylinder portion that is a predetermined distance away from said seating surface in an axial direction of said circular-cylinder portion so that the interference portion is spaced apart from and does not reach said seating surface, and
   the bump stopper cap further comprises a non-interference region that is a cylindrical region formed in said circular-cylinder portion at a region between an upper end of the interference portion and the seating surface so as to be between the interference portion and the seating surface, and at least one aperture extending through the circular-cylinder portion is formed in the non-interference region.

2. The bump stopper cap according to claim 1, wherein:
   the interference portion has a plurality of protrusions projecting from the inner circumference surface of the circular-cylinder portion inward in a radial direction and arranged in a circumference direction in the inner circumference surface of the circular-cylinder portion, and
   one of the at least one aperture is located above each of the protrusions.

* * * * *